United States Patent [19]

Teutsch et al.

[11] Patent Number: 5,069,612
[45] Date of Patent: Dec. 3, 1991

[54] MODULAR TUBULAR EXTRUSION HEAD

[75] Inventors: Erich O. Teutsch, Pittsfield, Mass.; Dennis J. Coyle, Clifton Park, N.Y.

[73] Assignee: General Electric Corporation, Pittsfield, Mass.

[21] Appl. No.: 585,452

[22] Filed: Sep. 20, 1990

[51] Int. Cl.⁵ .................. B29C 47/06; B29C 47/12
[52] U.S. Cl. ................ 425/133.1; 425/192 R; 425/462; 264/173
[58] Field of Search .......... 425/131.1, 131.5, 132, 425/133.1, 133.5, 191, 192 R, 461, 462; 264/171, 173

[56] References Cited

U.S. PATENT DOCUMENTS

| | | | |
|---|---|---|---|
| 3,321,803 | 5/1967 | Corbett | 425/133.1 |
| 3,649,143 | 3/1972 | Papesh et al. | 425/72.1 |
| 4,111,630 | 5/1978 | Shiomi et al. | 425/462 |
| 4,120,633 | 10/1978 | Feuerherm | 425/133.1 |
| 4,182,603 | 1/1980 | Knittel | 425/462 |
| 4,185,954 | 1/1980 | Murakami et al. | 425/133.1 |
| 4,657,497 | 4/1987 | Dehennan et al. | 425/133.1 |
| 4,798,526 | 1/1989 | Briggs et al. | 425/133.1 |
| 4,832,589 | 5/1989 | Gini et al. | 425/133.1 |
| 4,867,664 | 9/1989 | Fukuhara | 425/133.1 |

FOREIGN PATENT DOCUMENTS

WO88/00125  1/1988  PCT Int'l Appl. ............. 425/133.1

Primary Examiner—Jay H. Woo
Assistant Examiner—Khanh Phuong Nguyen
Attorney, Agent, or Firm—Rothwell, Figg, Ernst & Kurz

[57] ABSTRACT

A polymer resin extrusion head includes one or more coaxial annular extrusion modules each including a pair of mating annular members with central frustoconical portions having apexes with an axial dimension greater than the axial dimension of the outer portions of the modules so as to form air spaces around each module including frustoconical air space portions to avoid direct heat transfer between adjacent modules. A spiral channel having one or more convolutions extends from a resin inlet on the periphery of the module and gradually opens into a frustoconical transfer passage leading to an annular extrusion outlet on the inner edge of the module. The spiral channel evenly distributes resin from the inlet to the annular outlet.

18 Claims, 6 Drawing Sheets

MODULAR TUBULAR EXTRUSION HEAD

BACKGROUND OF THE INVENTION

1. Field of the Invention

The invention relates to resin extrusion apparatus and particularly to extrusion heads for producing articles with one or more tubular layers such as parisons, wire coatings, blown films, pipes, pultruded rods, profiles, reinforced sheets, etc.

2. Description of the Prior Art

Parisons, tubular extrusions of plastic resin which are subsequently blow molded to form bottles, are formed in the prior art by various apparatus some including extrusion heads which extrude successive layers of plastic resin onto a mandrel. A typical multilayer parison extrusion head has separate inlets for receiving heated and plasticized resin from individual screw extruders and has separate channels for distributing and expressing the respective plastic resins in successive layers on the mandrel. Each channel includes an annular equalization and distribution chamber surrounding and spaced from the mandrel for receiving the plastic resin from the corresponding inlet. From the equalization chamber the plastic resin is fed through a frustoconical transfer passage downward and inward to a tubular extrusion channel formed around the mandrel. This annular extrusion channel exits through an inwardly or outwardly flaring annular die which includes a conical core member which may be moved longitudinally relative to the outer member of the die to vary the thickness of the wall of the extruded tubular article.

One particularly useful and successful extrusion head for forming tubular articles such as parisons is disclosed in U.S Pat. No. 4,798,526. This head includes one or more individual annular extrusion modules surrounding respective successive portions of a stepped or tapered mandrel to form the annular extrusion channel which receives one or more successively extruded plastic resin layers from the modules. Each module has a pair of members with mating surfaces wherein the equalization and distribution chamber and the frustoconical transfer passage are formed. Having the head formed from individual coaxially spaced extrusion modules enables the head to be readily assembled and disassembled as well as enabling the assembly of an extrusion head with varying numbers of modules so that a module can be used in one assembled head to extrude a single layer tubular article or can be used in a differently assembled head to extrude any layer of a multilayer article. The modules forming an extrusion head can be positioned in any desired order. Furthermore the die modules are separated from each other by annular air spaces. Concentric tubular necks or collars extend from each module into engagement with an adjacent module to define the separation distance or the width of the air spaces between modules. These air spaces prevent heat transfer from a high temperature module to an adjacent low temperature module. Low temperature resins can be degraded if heated to the higher temperature. This patent further discloses polymer inlet pressures at the extrusion head of 4,000 to 6,000 psi (27,000 to 41,000 KPa) for polycarbonate, 2,500 to 4,000 psi (17,000 to 28,000 KPa) for polypropylene, and 2,000 to 3,000 psi (13,000 to 21,000 KPa) for tie resins and barrier resins.

U.S. Pat. Nos. 3,649,143, 4,111,630 and 4,182,603 disclose tubular extrusion dies for blow molding of multi-ply films and having nested frustoconical, hemispherical and cylindrical die members forming polymer distribution chambers wherein spiral and helical grooves are formed on the outer surfaces of inner members. These grooves progress from points near or at the inlets toward the outlets with decreasing depth so that the polymer flow is gradually forced out of the grooves and into the frustoconical, hemispherical or tubular space between die members to evenly distribute the polymer around the chamber. These nested arrangements have several deficiencies such as limiting any temperature differential between the different layers being extruded, requiring larger heads for extruding greater numbers of layers, and having long conical passages from the end of the groove or grooves to the annular outlet.

Generally the prior art tubular extrusion apparatus requires a restrictive frustoconical transfer passage from the distribution chamber to the annular outlet from which the tubular article is extruded. This restrictive passage provides a relatively large pressure drop, i.e., greater than 50% of the total pressure drop from the extrusion head inlet through the distribution region or chamber and the restrictive passage to the outlet, in order to assist in even distribution of the polymer in the distribution chamber. In the absence of the restrictive outlet passage with the relatively large pressure drop, the polymer tends to flow at a greater rate along the shortest path between the inlet to the distribution chamber and the closest region of the annular outlet producing unevenness in the thickness of the tubular article about its circumference.

While the prior art apparatus is generally efficient and successful in the extrusion of tubular articles such as multilayer parisons, blown films, wire coatings, etc., there is room for improvement. The prior art equalization chambers generally have regions where polymer flow is at a standstill or at least significantly reduced. Such reduced flow regions expose a portion of the polymer to heat over a longer period of time to cause polymer degradation. Further, substantially much more polymer flushing is required to flush the old polymer from the relatively dead regions when polymer colors are changed.

Accordingly one object of the present invention is to construct a new and improved polymer extrusion head for tubular extrusions with further improvement in circumferential uniformity in the thickness of the wall of the article being extruded.

Another object of the present invention is to reduce extrusion pressures in tubular extrusion apparatus.

Still another object of the invention is to eliminate relatively low flow rate regions of the polymer distribution path to reduce polymer degradation and to speed polymer changeover operations.

A further object of the invention is to provide improved temperature isolation between extrusion modules in a multi-module extrusion head to enable successive extrusion of plastic layers at greater temperature differentials.

SUMMARY OF THE INVENTION

The present invention is summarized in a polymer resin extrusion head for extruding tubular articles, including one or more annular extrusion modules secured between upper and lower clamp members along an axis of the module or modules wherein the extrusion module or modules have a pair of mating coaxial annular members secured together and defining a resin inlet on the periphery of the module, a coaxial bore, an annular extrusion outlet opening into the cylindrical surface of the bore, and channel means formed on mating surfaces of the annular members for receiving and distributing resin from the inlet to the outlet. The pair of mating members have inner and outer nested frustoconical portions defining the outlet by an annular space between the frustoconical portions, and the inner frustoconical portion has an inside surface with a greater angle from the axis than the angle of an outside surface of the outer frustoconical portion. The upper and lower clamp members have respective convex and concave frustoconical surfaces with angles less than and greater than, respectively, the inside surface of the inner frustoconical portion and the outside surface of the outer frustoconical portion so that the apex of the convex frustoconical surface of the upper clamp member abuts the inside surface of the inner frustoconical portion of the module or the uppermost module and the outside surface of the apex of the outer frustoconical portion of the outer frustoconical portion of the module or the lowermost module abuts the concave frustoconical surface of the lower clamp member to form air spaces between the module or modules and the upper and lower clamp members including frustoconical air space portions.

In another aspect, the invention is summarized by a plurality of coaxial annular extrusion modules with respective frustoconical inner portions each having an apex portion with a dimension along the axis which is greater that the axial dimension of the outer portions of the extrusion modules so that engagement of a forward side of the apex portion of one module with the rear side of the next module spaces the extrusion modules along the axis forming air spaces including frustoconical air space portions to enhance temperature isolation between extrusion modules.

In still another aspect, the invention is summarized in a plurality of coaxial annular extrusion modules extending around successive sections of a mandrel for extruding layers into a tubular extrusion channel defined between the modules and the mandrel and exiting through an annular die which has three successive sections, the first section progressively reducing the diameter of the annular extrusion channel, the second section having a constant diameter of the annular extrusion channel throughout its length, and the third section progressively increasing the diameter of the annular extrusion channel to a desired diameter.

Other objects, advantages and features of the invention will be apparent from the following description of the preferred embodiment taken in conjunction with the accompanying drawings.

DESCRIPTION OF THE PREFERRED EMBODIMENT

Figure 1:
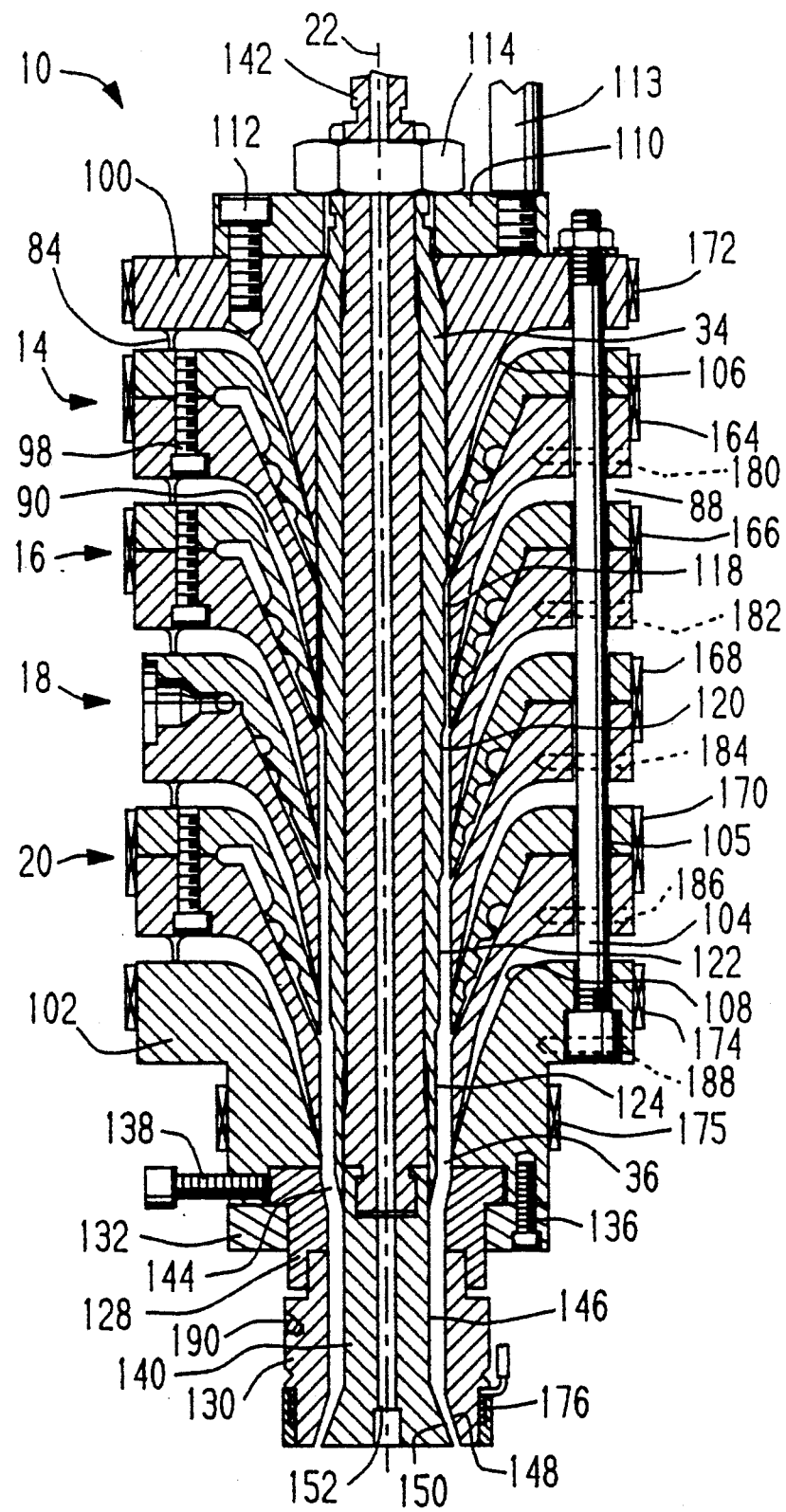
FIG. 1 is a section view of an extrusion head for a extruding a multilayer parison in accordance with the invention.
Figure 7:
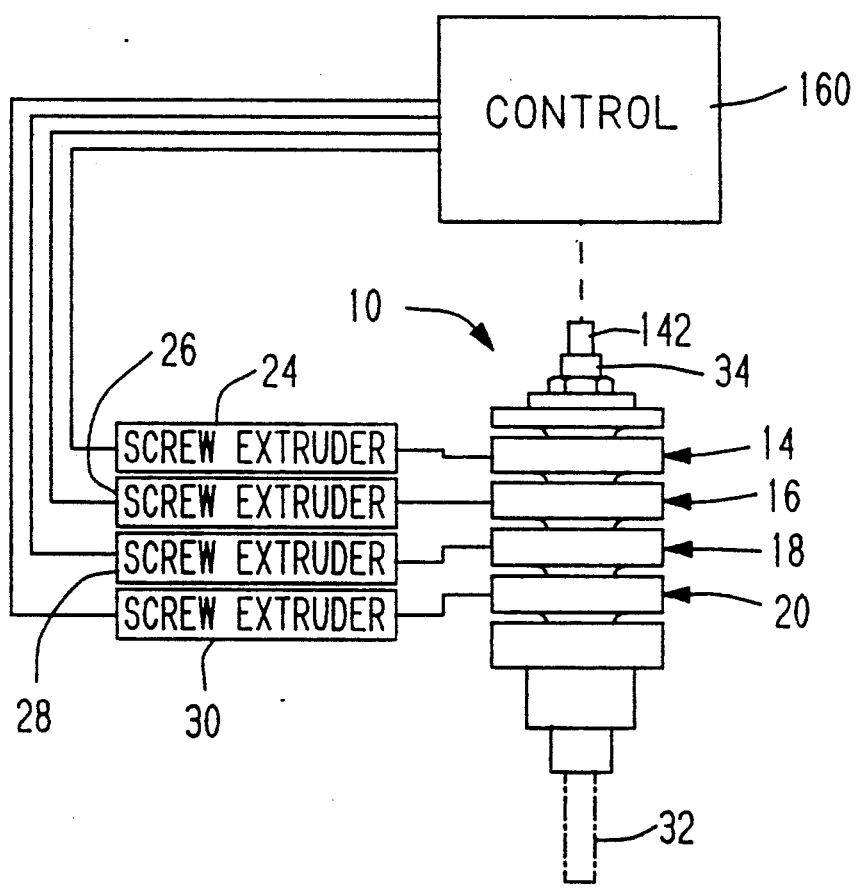
FIG. 7 is a diagrammatic view of a parison extrusion apparatus including the extrusion head of FIG. 1.

As shown in FIG. 7, one embodiment of an extrusion head, indicated generally at 10, in accordance with the invention includes one or more extrusion modules such as a plurality of extrusion modules indicated generally at 14, 16, 18 and 20 which receive streams of different plastic materials from respective conventional screw extruders 24, 26, 28 and 30 for forming a multilayer tubular article such as a parison 32. As shown in FIG. 1, the modules 14, 16, 18 and 20 are coaxially mounted in spaced relationship along the axis 22 of the modules so as to form air spaces 88 including frustoconical air spaces 90 thermally isolating each module in the head to enable improved extrusion temperature control of each layer being extruded.

In the illustrated parison extrusion head, the modules 14, 16 18 and 20 coaxially extend over spaced sections of a tapered stepped mandrel 34 so as to extrude their respective layers into a tubular extrusion channel 36 defined between the inner surfaces of the modules and the outer surface of the mandrel.

The modules 14, 16, 18 and 20 have substantially similar constructions. As shown in FIG. 3 for the module 18, each of the modules includes upper and lower members 40 and 42 which mate together and include a plastic material inlet 46 opening on the periphery of the module, an annular outlet 48 opening at the inner surface of the module, and one or more spiral channels such as a pair of spiral channels 50 and 51, FIGS. 2 and 3, extending from bifurcated inlet channels 52 and 53 to a position adjacent to the outlet 48. The inlet 46 is formed by machining the mating surfaces of the members or by boring along the parting line between the outer portions of the members. Alternatively, the inlet 46 can be formed by boring in one of the members 40 or 42 similar to that shown in U.S. Pat. No. 4,798,526. The inlet bifurcated channels 52 and 53 are machined in opposite directions through ninety degree arcs in the mating surfaces of the outer flange portions of the members 40 and 42. The mating flat or land surfaces of the flange portions of the members 40 and 42 sealing engage each other to close the channels 52 and 53.

Figure 4:
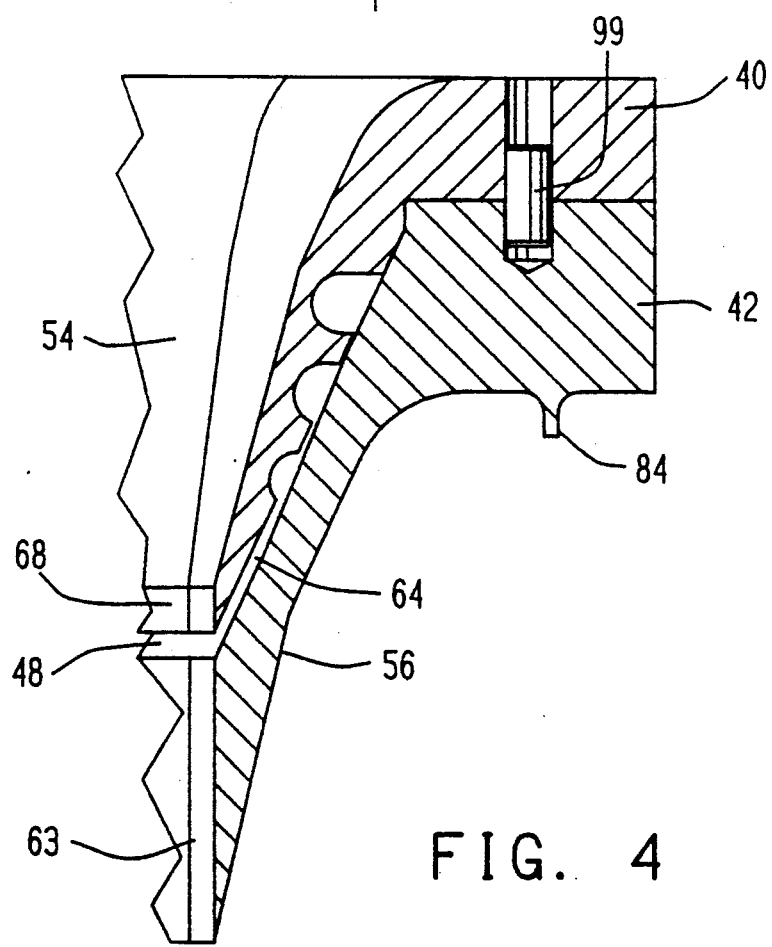
FIG. 4 is a sectional view, taken at line 4—4 of FIG. 2, of a portion broken away from the module of FIG. 3.
Figure 5:
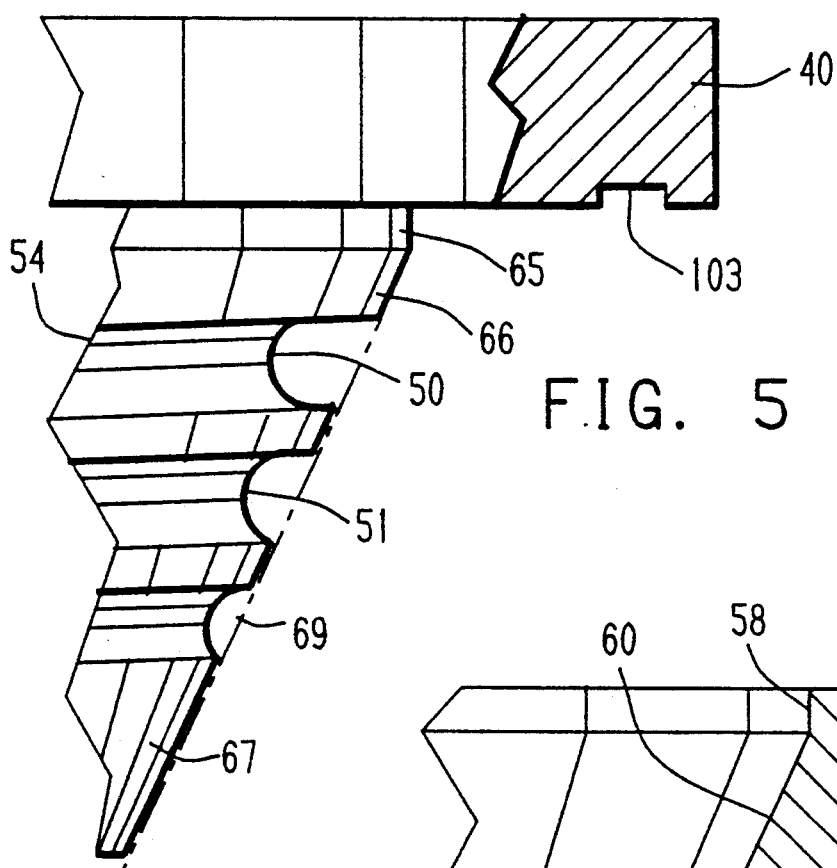
FIG. 5 is an elevational view, partially in section, of a broken away portion of an upper member of the module of FIG. 3 with the section taken at line 5,6—5,6 of FIG. 2.
Figure 6:
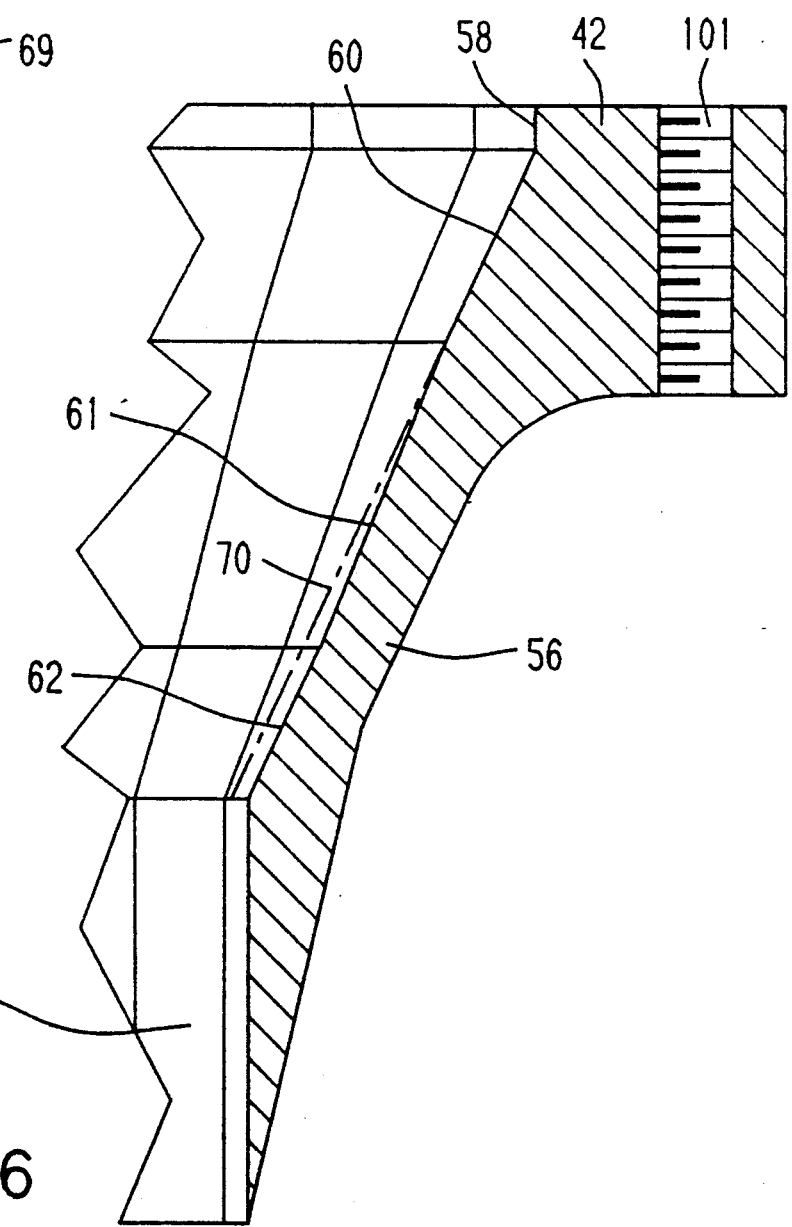
FIG. 6 is an elevational sectional view of a broken away portion of a lower member of the module of FIG. 3 with the section taken at line 5,6—5,6 of FIG. 2.

Center portions 54 and 56 of the members 40 and 42 are generally frustoconical with apexes extending downstream. As shown in FIG. 6, the inside surface of the center portion 56 has a cylindrical ring portion 58 and three successive frustoconical portions 60, 61 and 62 which extend inward from the ring portion 58 to the cylindrical surface 63 which defines a portion of the outer wall of the tubular extrusion channel 36, FIG. 1. The slant angle of the surface 61, i.e., the angle of the surface 61 relative to the axis 22, is less than the slant angle of the surfaces 60 and 62 so that the thickness of a frustoconical passage 64, FIG. 4, between the portions 54 and 56 gradually increases over the region of the spiral channels 50 and 51, as illustrated by the short and long dashed line 70 which has the same angle as surfaces 60 and 62. As shown in FIG. 5, the outside surface of the inner frustoconical portion 54 has a cylindrical ring portion 65 sealingly engaging the surface 58, a first frustoconical surface portion 66 extending inward from the ring portion 65 to the first convolution of the spiral channels 50 and 51, and a second frustoconical surface portion 67 extending inward from the outermost spiral convolution formed by channels 50 and 51 to the apex of the frustoconical portion 54 where a cylindrical surface 68, FIG. 4, defines a portion of the outer wall of the tubular extrusion channel 36. Edges 71, FIG. 2, between the first and second frustoconical surfaces 66 and 67 are formed in the land areas between the first convolutions of the spiral channels 50 and 51. The first frustoconical surface portion 66 has a slant angle equal to surface 60 so that surface portion 66 sealingly engages the surface portion 60. The second frustoconical surface portion 67 also has the same slant angle as surfaces 60 and 66 but has a reduced diameter, as illustrated by the long and short dashed line 69 which is an extension of the surface 66, so as to introduce an initial frustoconical space or thickness between the surface 61 and the land areas separating the spiral channels 50 and 51 to begin the frustoconical passage 64. At its inner end the frustoconical passage 64 defines the outlet 48.

Figure 2:
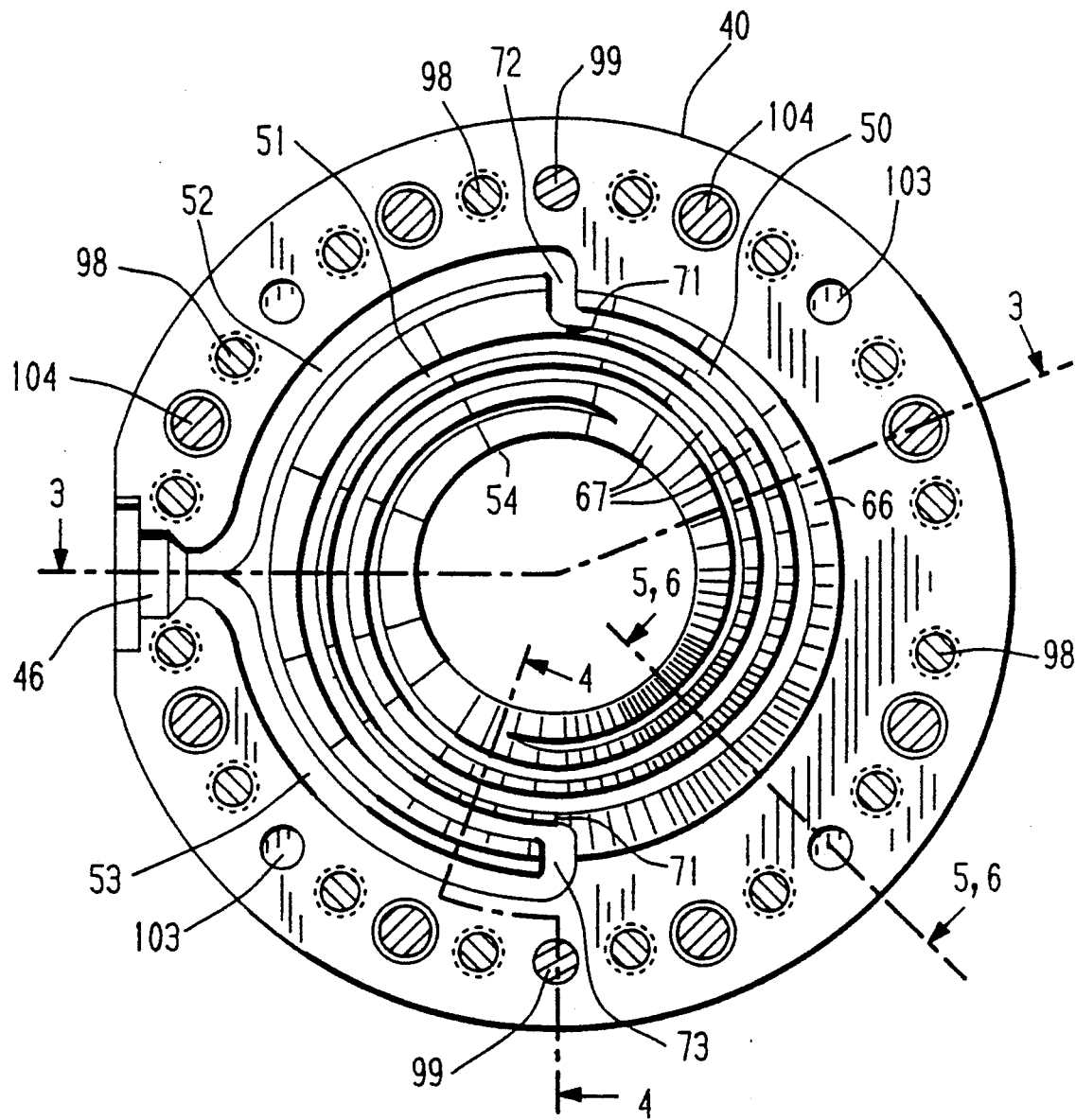
FIG. 2 is a bottom view of an upper member of one extrusion module in the head of FIG. 1.
Figure 3:
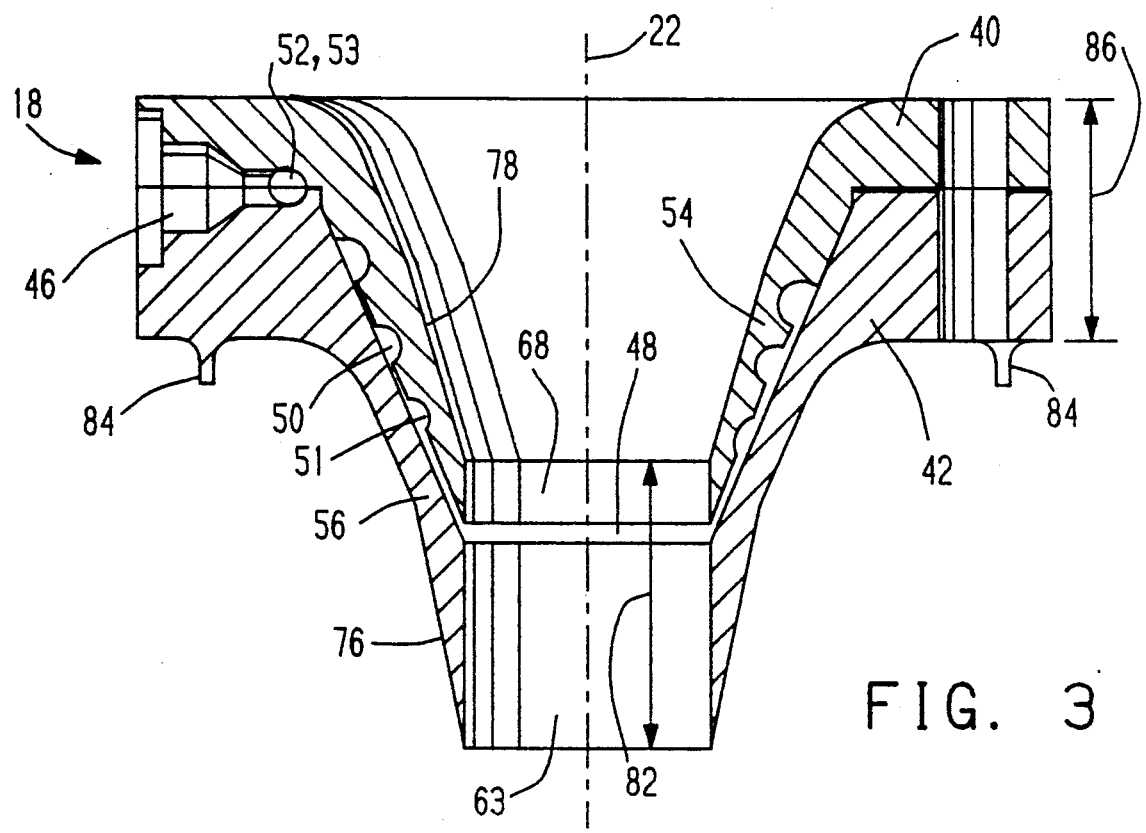
FIG. 3 is a sectional view, taken at line 3—3 of FIG. 2, of an extrusion module removed from the head of FIG. 1.

Referring to FIG. 2, the inlet channels 52 and 53 have extensions 72 and 73 machined in the surfaces 65 and 66 of the inner center portion 54 to open into the origins of the respective spiral channels 50 and 51. These origins are on opposite sides, 180° apart. The spiral channels 50 and 51 are formed by machining the frustoconical surface 67 of the inner frustoconical portion 54 and each extend clockwise for approximately one and one-half convolutions about the frustoconical portion 54. The cross-sectional area of each channel 50 and 51 gradually decreases from its origin to its endpoint so that the polymer forced into each channel at it origin is gradually dispersed into the increasing width of the frustoconical passage 64 to distribute the polymer evenly about the frustoconical portion 54. The pitch of the spiral channels, i.e., the spacing between adjacent convolutions, is constant and the depth of the spiral channels relative to surface 67 changes linearly so as to facilitate the machining of the channels.

Figure 8:
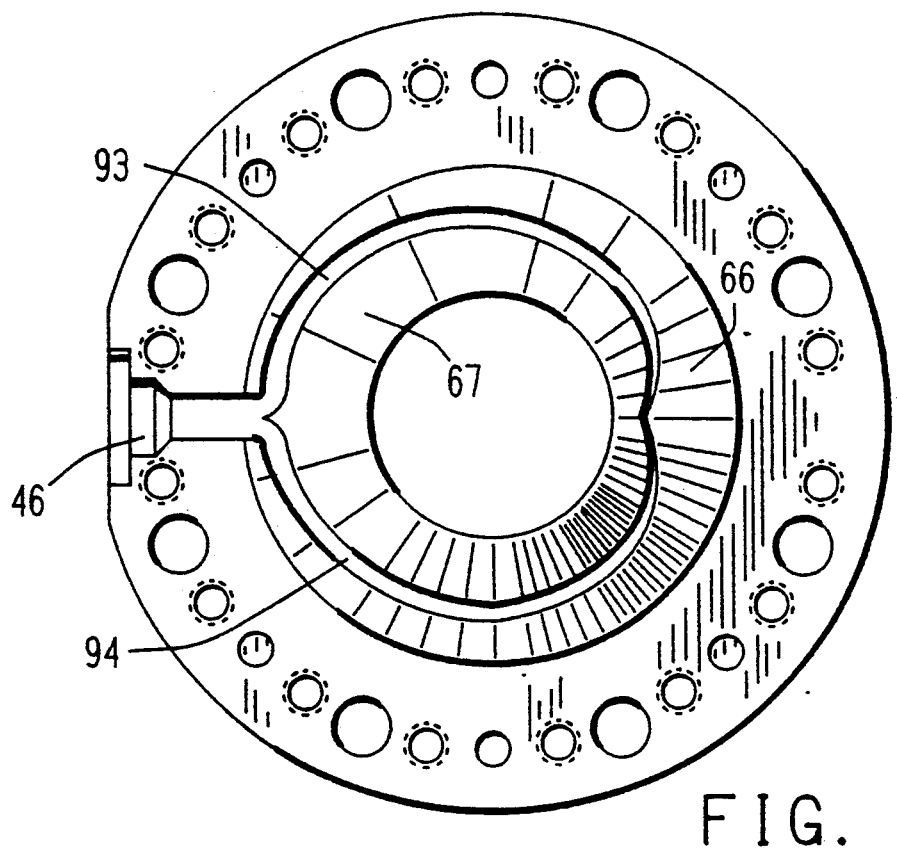
FIG. 8 is a view similar to FIG. 2 showing a variation of the spiral channel in the upper member of the extrusion module.
Figure 9:
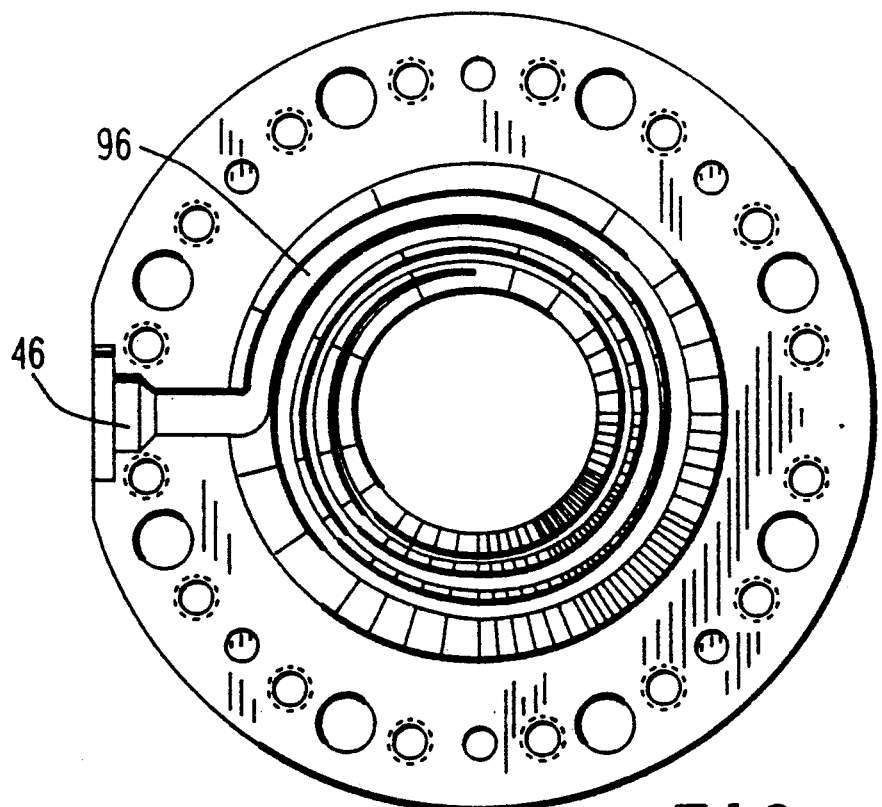
FIG. 9 is a view similar to FIGS. 2 and 6 showing another variation of the spiral channel in the upper member of the extrusion module.

The length of the spiral channels must together extend at least 360° around the inner frustoconical portion. In the modification shown in FIG. 8, channels 93 and 94 extend in opposite directions each through a minimum of 180° along spiral paths so that the channels 93 and 94 together extend completely around the inner frustoconical portion. The number of spiral channels and their direction can vary. The modification of FIG. 9 illustrates a single spiral channel 96 which makes more than three full convolutions around the inner frustoconical portion.

Referring back to FIG. 3, the outside surface 76 of the lower portion of the lower frustoconical portion 56 has a slant angle which is less than the slant angle of the inside surface 78 of the upper frustoconical portion 54 so that the width 82 of the inside surface of the module 18 along the axis 22 is greater than the width 86 of the outer portions of the module 18. The difference between the widths 82 and 86 is selected to provide the desired spacing 88, FIG. 1, between adjacent modules.

The lower edge of the apex of each higher module 14, 16 and 18 engages the upper side of the next lower module 16, 18 and 20 to define the spacing 88 between modules. Spacers 84 formed on the bottom of the flanges of the lower members 42 abut the adjacent modules to assist in maintaining even spacing between the flanges or outer portions of the modules around their circumference. These spacers 84 are broken by the various bores into the flange so as to permit air flow into and out of the spaces 88. The frustoconical air space portions 90 of the spaces 88 extend to the points of engagement between modules.

Bolts 98, FIGS. 1 and 2, secure the upper and lower members 40 and 42 of the extrusion modules 14, 16, 18 and 20 together. Guide pins 99, FIGS. 2 and 4, provide for proper alignment of the members 40 and 42 during assembly. Threaded bores 101, FIG. 6, in the members 42 are aligned with recesses 103, FIGS. 2 and 5, in the members 40 so that conventional jacking bolts (not shown) can be screwed into the bores 101 to engage the recesses and force the members 40 and 42 apart during disassembly.

As shown in FIG. 1, the modules 14, 16, 18 and 20 are held in the extrusion head 10 by upper and lower clamp members 100 and 102 and by bolts 104, see also FIG. 2, which extend through bores in the clamp members and the extrusion modules. The lower surface 106 of the upper clamp member 100 has a convex frustoconical configuration similar to the lower surface of the extrusion modules 14, 16, 18 and 20, and the upper surface 108 of the lower clamp member 102 has a concave frustoconical configuration similar to the upper surface of the extrusion modules. This enables extrusion modules to be interchanged in position as well as the clamp members to be used to hold a single extrusion module or any number of modules.

The mandrel 34 is tubular and extends through the upper clamp member and a mounting plate 110 fastened by bolts 112 to the upper clamp member 100. Bolts 113 secure the mounting plate 110 to conventional blow molding and supporting structure (not shown). A threaded nut 114 secures the upper end of the mandrel which has a tapered fit in the clamp member 100. The mandrel 34 is tapered downward with by a plurality of successive steps 118, 120, 122 and 124 which begin at each corresponding outlet of the modules 14, 16, 18 and 20 to provide for the extrusion of the successive polymer layers on the mandrel. The diameters of each step are selected in accordance with the desired thickness of the corresponding layer being extruded. Generally different mandrels are required for different arrangements of extrusion modules.

Alternatively, the mandrel can have a constant diameter through the extrusion modules and the inner diameters of the extrusion modules can be stepped. This limits the interchangeability of the modules, but blank modules can be manufactured with the inner diameters machined later after the extrusion head configuration is determined.

Annular upper and lower dies 128 and 130 are mounted by a die clamp 132 and bolts 136 and 138 on the bottom of the module clamp member 102. The lower die 130 is threaded to the upper die 128. Positioned within the dies is a die core 140 which is threaded onto the lower end of a shaft 142 slidably extending through the lumen of the mandrel 34. The die 128 has its die opening tapered or stepped down in diameter at 144 in correspondence to the tapered terminal end of the mandrel 34 so that a constant cross-sectional area of the extrusion passage is maintained. This reduced diameter extends along a section 146 of constant diameter through the upper portion of the lower die 130 with the bottom portion 148 of the lower die flaring out to the desired diameter of the article or parison. The bottom portion 150 of the die core 140 flares outwardly at an angle slightly greater than the angle of the die portion 148 so that the exit thickness of the annular extrusion channel is less than the upper portion of the extrusion channel to insure that the layers of plastic polymer are firmly bonded together and that the cross-sectional area of the extrusion passage is maintained. A center longitudinal bore 152 is formed through the die core 140 and the shaft 142 for passing gas into the parison being extruded to prevent collapse of the parison.

As shown in FIG. 7, the illustrated parison extrusion apparatus includes a conventional control 160 which controls the vertical position of the shaft 142 in the mandrel 34. Parisons being extruded are often varied in thickness from the bottom to the top; i.e. bottle bottom portions having inverted bottoms need thicker walls at the bottom to prevent bulging of the bottoms from the pressure of the bottle contents such as a carbonated beverage. Additional the control 160 can vary the extrusion pressures of the extruders 24, 26, 28 and 30 to vary the thickness of each layer being extruded relative to the other layers in a conventional manner. For example, the thickness of a barrier layer can be maintained uniform throughout the bottle height while the thickness of a structural layer is reduced in upper portions of the bottle.

Referring back to FIG. 1, electrical heater coils 164, 166, 168, 170, 172, 174, 175 and 176 are mounted on the extrusion modules 14, 16, 18 and 20, the clamp members 100 and 102 and the lower die member 130, respectfully, for initially heated the corresponding members to their desired operating temperatures as well as maintaining a proper temperature during operation. Thermocouple sensing elements 180, 182, 184, 186, 188 and 190 provide temperature signals of the extrusion modules 14, 16, 18 and 20, the lower clamp 102, and the die member 130 to conventional control circuitry (not shown) operating the heater coils.

In an example of a parison suitable for blow molding to form a bottle, the parison is formed with inner and outer layers of polycarbonate, and intermediate layers of amorphous polyamide and regrind.

The described embodiment has several advantages over the prior art extrusion apparatus. The spiral channel or channels forming together at least one full convolution gradually opening into the frustoconical passage 64 results in pressure differentials in the channel or channels being cancelled by pressure differentials in the thinner upper portions of the frustoconical passage 64. This eliminates the need for an annular pressure equalization and distribution chamber which is generally required in prior art tubular article extrusion apparatus. Such equalization and distribution chambers still have some unequal pressure, i.e., there must be a pressure differential to produce plastic polymer flow from one side to the other side of the annular chamber. The uneven pressure around the annular outlet produces uneven thicknesses in the layers being formed in the parison. Thus the embodiments of FIGS. 1-9 produce superior circumferential layer thickness uniformity.

Furthermore a generally restrictive frustoconical transfer passage extends from the prior art equalization and distribution chamber to the annular outlet in order to minimize the pressure differential in the equalization and distribution chamber. This prior art restrictive transfer passage results in a requirement for a substantially higher melt pressure compared to the present embodiment which relies upon at least one convolution formed by a channel or by the combined length of two or more channels of decreasing cross section opening into the gradual increasing thickness of the frustoconical passage 64 to minimize circumferential pressure differentials at the outlet 48. The size of the spiral channel or channels and the thickness of the passage 64 are selected to produce substantially less pressure drop between the inlet 46 and outlet 48 compared to the prior art.

Still further the elimination of the prior art equalization chamber with its opening into a restrictive frustoconical transfer passage reduces shear on the plastic polymer that is produced by such opening. Substantially less shear results from the present gradual opening of the spiral channel or channels through one or more spiral convolutions in the frustoconical passage 64. This results in increased strength in the article being produced.

Circumferential polymer extrusion temperatures tend to be substantially more uniform in the embodiments having two or more spiral distribution channel convolutions. Since polymer melt in the prior art flows from the inlet side of the equalization and distribution chamber to the opposite side, a temperature differential can be produced where the inlet polymer melt temperature differs from the average temperature of the distribution module. By passing the melt through a plurality of convolutions circumferentially around the extrusion module, the tendency for circumferential temperature differentials is reduced.

The present embodiment provides greater temperature isolation between adjacent modules with a relatively simple and inexpensive structure. The prior art included abutting collars for spacing modules, but the collars had substantial thickness to transfer heat between modules. The present embodiment by including frustoconical air spaces 90 provides improved temperature isolation between extrusion modules.

Still further, the die output structure with section 144 reducing the annular extrusion channel diameter followed by the section 146 of uniform diameter and then the section 148 producing an increase in diameter to the desired article or parison diameter, results in improved product by eliminating prior art tendencies for failure of multiple layers to adhere uniformly together.

While the described embodiment is directed to manufacture of parisons used for blow molding bottles, the disclosed modular extrusion head is suitable for the manufacture of many other tubular articles such as film which is formed by slitting a tubular form with or without blowing of the tubular form; pipe or other elongated profile article which may or may not be filled with foam such as through bore 152; glass mat reinforced sheet wherein polymer is extruded from one or more annular extrusion heads with rectangular center bores onto a glass fiber mat; pultruded sheet, rod or profile article; and wire coatings. For certain applications such as forming wire coatings or extruding coatings on other elongated materials, the extrusion head does not include a mandrel; rather the object on which the coatings are being extruded take the place of the mandrel.

The above described embodiment is only illustrative of the disclosed embodiment and many other embodiments, variations, modifications, and changes in detail can be devised without departing from the scope and spirit of the invention as defined in the following claims.

What is claimed is:

1. A polymer resin extrusion head for extruding tubular articles, comprising:
    one or more annular extrusion modules disposed along an axis of the module or modules;
    upper and lower clamp members being disposed on opposite sides of the extrusion module or modules along the axis;
    means securing the annular extrusion module or modules between the upper and lower clamp members;
    said extrusion module or each module having a pair of mating coaxial annular members, and means securing the pair of mating annular members together;
    said pair of mating annular members defining a resin inlet on the periphery of the module, a coaxial bore having an inner cylindrical surface, an annular extrusion outlet opening into said inner cylindrical surface of the bore, and channel means formed on mating surface of the annular members for receiving and distributing resin from the inlet to the outlet;
    said pair of mating members having inner and outer nested frustoconical portions, respectively, with the outlet being defined by adjacent mating inner and outer surfaces of said inner and outer frustoconical portions which form an annular space between the frustoconical portions;
    said inner frustoconical portion having an inside surface with a greater angle from the axis than the angle of an outside surface of the outer frustoconical portion;
    said upper and lower clamp members having respective convex and concave frustoconical surfaces with angles less than and greater than, respectively, the inside surface of the inner frustoconical portion and the outside surface of the outer frustoconical portion so that the apex of the convex frustoconical surface of the upper clamp member abuts the inside surface of the inner frustoconical portion of the module or the uppermost module and the outside surface of the apex of the outer frustoconical portion of the outer frustoconical portion of the module or the lowermost module abuts the concave frustoconical surface of the lower clamp member to form air spaces between the module or modules and the upper and lower clamp members including frustoconical air space portions.

2. A polymer resin extrusion head as defined in claim 1 wherein the channel means includes one or more channels extending spirally in the outer mating surface of the inner frustoconical portion to form spiral channel means extending completely around the inner frustoconical portion and gradually opening into the annular frustoconical space between the frustoconical portions to distribute the resin around the inner frustoconical portion and into the outlet.

3. A polymer resin extrusion head as defined in claim 2 wherein the frustoconical portions have mating surfaces defining a frustoconical space with an increasing thickness toward the apexes, and the spiral channel means gradually open into the frustoconical space progressively toward the apexes.

4. A polymer resin extrusion head as defined in claim 3 wherein the mating surfaces of the frustoconical portions have base sections sealing engaging each other, and the mating surfaces defining the frustoconical space extend from the base sections to the apexes of the frustoconical portions with the increasing thickness of the frustoconical space being formed over a region containing the spiral channel.

5. A polymer resin extrusion head as defined in claim 4 wherein the frustoconical space between the frustoconical portions is initially determined by a reduction in diameter of the inner frustoconical portion downstream from the first convolution of the spiral channel, and the increasing thickness of the frustoconical space is formed by a frustoconical surface portion on the inside of the outer frustoconical portion having a slant angle less that a slant angle of the surface of inner frustoconical portion over the region of the spiral channel.

6. A polymer resin extrusion head as defined in claim 1 including a plurality of the annular extrusion modules spaced longitudinally along the axis so as to form air spaces including frustoconical air space portions between adjacent modules to reduce direct heat transfer between adjacent modules.

7. A polymer resin extrusion head as defined in claim 2 including a plurality of the annular extrusion modules spaced longitudinally along the axis so as to form air spaces including frustoconical air space portions between adjacent modules to reduce direct heat transfer between adjacent modules.

8. A polymer resin extrusion head as defined in claim 3 including a plurality of the annular extrusion modules spaced longitudinally along the axis so as to form air spaces including frustoconical air space portions between adjacent modules to reduce direct heat transfer between adjacent modules.

9. A polymer resin extrusion head as defined in claim 4 including a plurality of the annular extrusion modules spaced longitudinally along the axis so as to form air spaces including frustoconical air space portions between adjacent modules to reduce direct heat transfer between adjacent modules.

10. A polymer resin extrusion head as defined in claim 5 including a plurality of the annular extrusion modules spaced longitudinally along the axis so as to form air spaces including frustoconical air space portions between adjacent modules to reduce direct heat transfer between adjacent modules.

11. A polymer resin extrusion head as defined in claim 6 including a mandrel; and wherein the plurality of the annular extrusion modules are spaced longitudinally along the mandrel.

12. A polymer resin extrusion head as defined in claim 11 wherein the plurality of annular extrusion modules have the same internal diameter, and the mandrel has a plurality of successive sections with progressively smaller diameters beginning at the respective outlets of the annular extrusion dies.

13. A polymer resin extrusion head for extruding multilayer tubular articles comprising a plurality of coaxial annular extrusion modules;
    means for holding the modules spaced longitudinally along the axis of the modules;
    each module having a pair of mating coaxial annular members, and means securing the pair of mating annular members together;
    said pair of mating annular members defining a resin inlet on the periphery of the module, a coaxial bore, an annular extrusion outlet opening into the cylindrical surface of the bore, and channel means formed on mating surfaces of the annular members for receiving and distributing resin from the inlet to the outlet;

each module further having a center portion which is frustoconical and extends to an apex and wherein the frustoconical center portion at the minimum diameter portion thereof has an axial width of the inside surface of the module along the axis thereof which is greater than the axial width of the outer portion of each next adjacent module so that the apex of each preceding module engages each succeeding adjacent module to form air spaces which include frustoconical air space portions between adjacent modules to produce enhanced temperature isolation between modules.

14. A polymer resin extrusion head as defined in claim 13 wherein the channel means includes one or more channels extending spirally in the outer surface of the inner frustoconical portion to form spiral channel means extending completely around the inner frustoconical portion and gradually opening into the annular frustoconical space between the frustoconical portions to distribute the resin around the inner frustoconical portion and into the outlet.

15. A polymer resin extrusion head as defined in claim 14 wherein the frustoconical portions have mating surfaces defining a frustoconical space with an increasing thickness toward the apexes, and the spiral channel means gradually open into the frustoconical space progressively toward the apexes.

16. A polymer resin extrusion head as defined in claim 15 wherein the mating surfaces of the frustoconical portions have base sections sealing engaging each other, and the mating surfaces defining the frustoconical space extend from the base sections to the apexes of the frustoconical portions with the increasing thickness of the frustoconical space being formed over a region containing the spiral channel.

17. A polymer resin extrusion head as defined in claim 16 wherein the frustoconical space between the frustoconical portions is initially determined by a reduction in diameter of the inner frustoconical portion downstream from the first convolution of the spiral channel, and the increasing thickness of the frustoconical space is formed by a frustoconical surface portion on the inside of the outer frustoconical portion having a slant angle less that a slant angle of the surface of inner frustoconical portion over the region of the spiral channel.

18. A polymer resin extrusion head as defined in claim 13 including a mandrel; and wherein the plurality of the annular extrusion modules are spaced longitudinally along the mandrel.

* * * * *